United States Patent [19]

Idota

[11] Patent Number: 5,478,671
[45] Date of Patent: Dec. 26, 1995

[54] NONAQUEOUS SECONDARY BATTERY

[75] Inventor: Yoshio Idota, Kanagawa, Japan

[73] Assignee: Fuji Photo Film Co., Ltd., Kanagawa, Japan

[21] Appl. No.: 51,307

[22] Filed: Apr. 3, 1993

[30] Foreign Application Priority Data

Apr. 24, 1992 [JP] Japan .................................. 4-106642

[51] Int. Cl.⁶ .................................................. H01M 4/02
[52] U.S. Cl. .................................. 429/194; 429/218
[58] Field of Search ........................ 429/218, 194

[56] References Cited

U.S. PATENT DOCUMENTS

| 4,464,447 | 8/1984 | Lazzari et al. | ........................... 429/194 |
| 5,300,376 | 4/1994 | Plichta et al. | ........................... 429/197 |

FOREIGN PATENT DOCUMENTS 0511632   11/1992   European Pat. Off. .

OTHER PUBLICATIONS

Journal of Power Science, vol. 7, No. 2, Jan. 1982, Lausanne, pp. 145–152, "$Mo_{0.3}V_{0.7})_2O_5$ as a Solid Solution Cathode for Li Cells. Part II. Structural Characteristics and Secondary Cells".

Primary Examiner—Prince Willis, Jr.
Assistant Examiner—M. Nuzzolillo
Attorney, Agent, or Firm—Sughrue, Mion, Zinn, Macpeak & Seas

[57] ABSTRACT

A nonaqueous secondary battery comprises an anode active material, a cathode active material and a nonaqueous electrolyte. The anode active material is a transition metal oxide of which an inherent crystal structure has been changed by insertion of lithium ions, and is in the condition that the changed crystal structure is not changed during repeated charging and discharging.

18 Claims, 4 Drawing Sheets

NONAQUEOUS SECONDARY BATTERY

FIELD OF THE INVENTION

This invention relates to a nonaqueous secondary battery having high discharge capacity, excellent characteristics in charge-discharge cycle and assured safety.

BACKGROUND OF THE INVENTION

A nonaqueous secondary battery basically comprises an anode active material, an electrolyte and a cathode active material comprising a lithium metal or a lithium alloy. In the secondary battery using lithium metal as the anode active material, highly active tree-like lithium metal (dendrite) or mossy lithium metal (moss) is formed on the anode during repetition of charging and discharging. When the dendrite or the moss peels off to become in contact with the cathode active material of the battery or when it grows to touch the cathode active material directly, an inner short circuit is produced within the battery.

Recently, as the battery using no lithium metal, proposed are some batteries using carbonaceous materials in which lithium metal or lithium ion can be intercalated and then deintercalated. Such batteries using carbonaceous materials generally have an advantage of increased discharge capacity. Even in the battery, however, lithium metal is deposited and the dendrite is formed on the carbonaceous material when the battery is overcharged or rapidly-charged because the carbonaceous material itself is an electric conductor. Therefore, the amount of the cathode active material is usually lowered so as to prevent the battery from overcharging. In such battery, however, the discharge capacity is not satisfactorily increased due to the restriction of the amount of the active material. Further, since the density of the carbon material is relatively low, its capacity per volume is small. Consequently, the charging-discharging capacity of the battery using such carbonaceous material is restricted for the above two reasons; the restrictions of the amount of the active material and the small capacity per volume.

On the other hand, as known examples of the anode active material other than lithium metal, alloy thereof and carbonaceous material, there can be mentioned $TiS_2$ in which lithium ion can be intercalated and deintercalated, $LiTiS_2$ (U.S. Pat. No. 3,983,476), $WO_2$ having a rutile structure (U.S. Pat. No. 4,198,476), spinel compounds such as $Li_xFe(Fe_2)O_4$ and $Li_xMnO_4$ (U.S. Pat. No. 4,507,371), lithium compounds of electrochemically-synthesized $Fe_2O_3$ (U.S. Pat. No. 4,464,447), lithium compounds of $Fe_2O_3$ (Japanese Patent Provisional Publication No. 3 (1991)-112070), $Nb_2O_5$ (Japanese Patent Publication No. 62(1987)-59412 and Japanese Patent Provisional Publication No. 2(1990)-82447), iron oxides such as FeO, $Fe_2O_3$ and $Fe_3O_4$, and cobalt oxides such as CoO, $Co_2O_3$ and $Co_3O_4$ (Japanese Patent Provisional Publication No. 3(19901)-291862). However, each of these known compounds has too high redox potential to give a nonaqueous secondary battery having high discharge potential of 3 V or higher and high discharge capacity.

As known combinations of the metal chalcogenide cathode active material and the metal chalcogenide anode active material, there can be mentioned $TiS_2$ and $LiTiS_2$ (U.S. Pat. No. 983,476), chemically synthesized $Li_{0.1}V_2O_5$ and $LiMn_{1-s}Me_sO_2$ (0.1<s<1, Me: transition metal, Japanese Patent Provisional Publication No. 63 (1988)-210028); chemically synthesized $Li_{0.1}V_2O_5$ and $LiCo_{1-s}Fe_sO_2$ (s=0.05–0.3, Japanese Patent Provisional Publication No. 63(1988)-211564), chemically synthesized $Li_{0.1}V_2O_5$ and $LiCo_{1-s}Ni_sO_2$ (s=0.5–0.9, Japanese Patent Provisional Publication No. 1(1989)-294364); $V_2O_5$ and $Nb_2O_5$+lithium metal (Japanese Patent Provisional Publication No. 2(1990)-82447), $V_2O_5$ or $TiS_2$ and electrochemically synthesized $Li_xFe_2O_3$ ((U.S. Pat. No. 4,464,447; *Journal of Power Sources* vol.8(1982) pp.289); $LiNi_xCo_{1-x}O_2$ for both of cathode and anode active materials ($0 \leq x < 1$, Japanese Patent Provisional Publication No. 1(1989)-120765; according to the example of this specification, the same compound was used for both of cathode and anode active materials); and $LiCoO_2$ or $LiMn_2O_4$ (for cathode) and iron oxides such as FeO, $Fe_2O_3$ and $Fe_3O_4$, or cobalt oxides such as CoO, $Co_2O_3$ and $Co_3O_4$ (for anode) (Japanese Patent Provisional Publication No. 3(1991)-291862).

However, any of these combinations can not give a lithium secondary battery which has high capacity and high discharge potential of 3 V or higher.

In the above-mentioned $Li_xFe_2O_3$ (*Journal of Power Sources* vol.8(1982) pp.289) which is used as the anode active material after electrochemical insertion of lithium ions, its X-ray diffractogram is changed by insertion of lithium ions and the diffractogram is further changed after discharging. Therefore, the charging-discharge capacity is lowered during repeated charging and discharging, charge-discharge cycle life is rendered short in addition to the low discharge potential. Further, in the above-mentioned spinel compound such as $Li_xFe(Fe_2)O_4$ or $Li_xMnO_4$ (U.S. Pat. No. 4,507,371) which is also used as the anode active material by electrochemical insertion of lithium ions thereinto, the required insertion is carried out so as not to destroy the spinel structure of the compound, and repeated charging and discharging are performed keeping the spinel structure. The reason resides in that the compound does not serve as an active material of a secondary battery if the spinel structure is destroyed due to insertion of an excessive amount of lithium ions and repetition of charging-discharging.

As is described above, a compound that is scarcely changed in the crystalline structure during repetition of charging and discharging and that there is little restrict in the insertion amount of lithium ions, is preferred as an anode active material. Hence, such compound is desired to produce a nonaqueous secondary battery having a high discharge potential and high discharge capacity and showing little the lowering of the discharge capacity during repeated charging and discharging.

SUMMARY OF THE INVENTION

It is an object of the present invention to provide a nonaqueous secondary battery having high safety, high discharging voltage, high discharge capacity and a long life in the charge-discharge cycle.

The present inventors have studied in order to obtain an anode active material having high discharge potential and high discharge capacity. As a result, they have found that the following lithium-inserted transition metal oxide satisfies the above required characteristics.

The invention resides in a nonaqueous secondary battery which comprises an anode active material, a cathode active material and a nonaqueous electrolyte;

wherein said anode active material is a transition metal oxide of which an inherent crystal structure has been changed by insertion of lithium ions, and is in the condition that said changed crystal structure is essentially not changed during repeated charging and discharging.

Preferred embodiments of the above nonaqueous secondary battery are as follows:

(1) The nonaqueous secondary battery wherein the changed crystal structure of the anode active material is characterized by X-ray diffractogram wherein each peak strength observed in X-ray diffractogram at the diffraction angle (2θ) of 5 to 70 degree using Cu-Kα ray is in the range of 20 to 1,000 cps.

(2) The nonaqueous secondary battery wherein the change of inherent structure by insertion of lithium ions is confirmed by change of X-ray diffractogram wherein strength of a maximum peak of the transition metal oxide prior to insertion of lithium ions decreases to one fifth thereof or less, said maximum peak being observed in X-ray diffractogram at the diffraction angle (2θ) of 5 to 70 degree using Cu-Kα ray.

(3) The nonaqueous secondary battery wherein the anode active material is obtained by electrochemical insertion of lithium ions.

(4) The nonaqueous secondary battery wherein the transition metal oxide prior to insertion of lithium ions further contains lithium.

(5) The nonaqueous secondary battery wherein the transition metal oxide prior to insertion of lithium ions is obtained by burning.

(6) The nonaqueous secondary battery wherein said anode active material is obtained by electrochemically inserting lithium ions into the transition metal oxide prior to insertion of lithium ions in the amount of 27 to 340 mAh (corresponding to 1 to 50 mmole) per 1 g of the oxide.

(7) The nonaqueous secondary battery wherein the transition metal oxide prior to insertion of lithium ions comprises a transition metal oxide represented by $Li_p MO_j$ wherein M is at least one transition metal selected from the group consisting of Ti, V, Mn, Co, Fe, Ni, Cr, Nb and Mo, p is in the range of 0 to 3.1, and j is in the range of 1.6 to 4.1.

(8) The nonaqueous secondary battery wherein the anode active material comprises a lithium-containing transition metal oxide represented by $LixMO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.

(9) The lithium secondary battery wherein the anode active material comprises a lithium-containing transition metal oxide represented by $Li_x M_q V_{1-q} O_j$ wherein M is at least one transition metal, x is in the range of 0.17 to 11.25, q is in the range of 0 to 0.7, and j is in the range of 1.3 to 4.1.

(10) The nonaqueous secondary battery wherein the cathode active material comprises a lithium-containing transition metal oxide represented by $Li_y MO_z$ wherein M is at least one transition metal selected from the group consisting of Co, Mn, Ni, V and Fe, y is in the range of 0.2 to 1.2, and z is in the range of 1.4 to 3.

(11) The nonaqueous secondary battery wherein the cathode active material comprises a lithium-containing transition metal oxide selected from the group consisting of $Li_y CoO_2$, $Li_y NiO_2$, $Li_y Co_a Ni_{1-a} O_2$, $Li_y Co_b V_{1-b} O_z$, $Li_y Co_b Fe_{1-b} O_2$, $Li_y Mn_2 O_4$, $Li_y Mn_c Co_{2-c} O_4$, $Li_y Mn_c Ni_{2-c} O_4$, $Li_y Mn_c V_{2-c} O_4$ and $Li_y Mn_c Fe_{2-c} O_4$ wherein y is in the range of 0.5 to 1.2, a is in the range of 0.1 to 0.9, b is in the range of 0.8 to 0.98, c is in the range of 1.6 to 1.96, and z is in the range of 2.01 to 2.3.

The invention further resides in a nonaqueous secondary battery which comprises an anode active material, a cathode active material and a nonaqueous electrolyte;

wherein said anode active material comprises lithium-containing transition metal oxide, of which crystal structure is characterized by X-ray diffractogram wherein each peak strength observed in X-ray diffractogram at the diffraction angle (2θ) of 5 to 70 degree using Cu-Kα ray is in the range of 20 to 1,000 cps.

Preferred embodiments of the above nonaqueous secondary battery are as follows:

(1) The nonaqueous secondary battery wherein said anode active material comprises a lithium-containing transition metal oxide represented by $Li_x MO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.

(2) The lithium secondary battery wherein said anode active material comprises a transition metal oxides represented by $Li_x M_q V_{1-q} O_j$ wherein M is at least one transition metal, x is in the range of 0.17 to 11.25, q is in the range of 0 to 0.7, and j is in the range of 1.3 to 4.1.

"Transition metals" in the invention means metals of atomic number 21 (Sc) to atomic number 30 (Zn), atomic number 39 (Y) to atomic number 48 (Cd), and atomic number 57 (La) to atomic number 80 (Hg).

The nonaqueous secondary battery of the invention which comprises an anode active material of lithium inserted transition metal oxide, a cathode active material and a nonaqueous electrolyte, is extremely improved in discharge capacity compared with a conventional nonaqueous secondary battery, and has long life in the charge-discharge cycle.

In more detail, the anode active material of the invention is a transition metal oxide of which inherent crystal structure has been changed by insertion of lithium ions, and is in the condition that the changed crystal structure is not changed during repetition of charging and discharging. The lithium-inserted transition metal oxide has itself low redox potential in discharging condition and stability during repetition of charging and discharging, and therefore it is very suitable as an anode active material. Hence, a nonaqueous secondary battery employing the anode active material shows high discharge capacity and a long life in the charge-discharge cycle.

DETAILED DESCRIPTION OF THE INVENTION

The nonaqueous secondary battery of the invention has a basic structure comprising an anode active material, a cathode active material and a nonaqueous electrolyte containing lithium salt.

The anode active material of the invention is obtained by inserting (preferably electrochemically) lithium ions to a transition metal oxide which may contain lithium. In this case, the insertion of lithium ions is carried out until an inherent crystal structure of the transition metal oxide has been changed. Further, the resultant changed crystal structure is not changed during repeated charging and discharging. In the invention, the change of the inherent crystal structure means change from a certain crystal structure to a different crystal structure, or change from a certain crystal structure to a structure having no crystal structure (noncrystal structure). The above change of inherent crystal structure and no change of the lithium-inserted crystal structure can be confirmed on X-ray diffractograms.

The transition metal oxide prior to insertion of lithium (hereinafter is referred to as a precursor for an anode active material) is preferably obtained by mixing a lithium compound and one or more transition metal compound(s) at a ratio of the lithium compound and the total transition metal compounds (lithium compound/total transition metal compounds) of not more than 3.1 by mole to subjecting them to reaction. The transition metal generally includes at least one metal selected from the group consisting of Ti, V, Mn, Co, Ni, Fe, Cr, Nb and Mo. The transition metal preferably includes at least one metal selected from the group consisting of Ti, V, Mn, Co, Ni and Fe. The ratio of the lithium compound and the total transition metal compounds preferably is in the range of 0.2 to 3.1.

The precursor for the anode active material of the invention generally is at least one transition metal oxide represented by $Li_pMO_j$ wherein M is at least one transition metal of which at least one is selected from the group consisting of Ti, V, Fin, Co, Fe, Ni, Cr, Nb and Mo, p is in the range of 0 to 3.1, and j is in the range of 1.6 to 4.1.

The precursor for the anode active material preferably is a transition metal oxide represented by $Li_pM_{1q1}M_{2q2}$- - - $M_{nqn}O_j$ wherein $M_1M_2$- - - $M_n$ are each a transition metal of which at least one is selected from the group consisting of Ti, V, Mn, Co, Ni and Fe, p is in the range of 0 to 3.1, q1+q2+ - - qn is 1, n is in the range of 1 to 10, and j is in the range of 1.6 to 4.1. In the above formula, further preferred are that p is in the range of 0 to 3.1, n is in the range of 1 to 4, and j is in the range of 1.8 to 4.1. Particularly preferred are p of 0.2 to 3.1, n of 1 to 3, and j of 1.8 to 4.1.

The precursor for the anode active material advantageously contains a transition metal such as V, Cr, Nb or Mo which has stably 5 or 6 valence, from the viewpoint of discharge capacity. In this regard, the precursor preferably contains V.

The above precursor for the anode active material containing V generally is a transition metal oxide represented by $Li_xM_qV_{1-q}O_j$ wherein M is at least one transition metal (M preferably is at least one metal selected from the group consisting of Ti, Mn, Co, Ni, Fe, Cr, Nb and Mo), x is in the range of 0.17 to 11.25, q is in the range of 0 to 0.7, and j is in the range of 1.3 to 4.1. The precursor preferably is a transition metal oxide represented by $Li_pM_{1q1}M_{2q2}$- - - $M_{nqn}V_{qv}O_j$ wherein $M_1M_2$- - - $M_n$ are each a transition metal, p is in the range of 0 to 3.1, q1+q2+ - - qn is 1, n is in the range of 1 to 9, and j is in the range of 1.3 to 4.1. The precursor for the anode active material containing V, more preferably is a transition metal oxide represented by $Li_pM_{1q1}M_{2q2}V_{1-(q1+q2)}O_j$ wherein $M_1$ and $M_2$ are each a transition metal, p is in the range of 0.2 to 3.1, q1+q2 is in the range of 0 to 0.7, and j is in the range of 1.3 to 4.1. The precursor for the anode active material containing V, most preferably is a transition metal oxide represented by $Li_pCo_qV_{1-q}O_j$ or $Li_pNi_qV_{1-q}O_j$ wherein $M_1$ and $M_2$ are each a transition metal, p is in the range of 0.3 to 2.2, q is in the range of 0.02 to 0.7, and j is in the range of 1.5 to 2.5.

Particularly preferred examples of the precursor for the anode active material include $Li_pCoVO_4$ or $Li_pNiVO_4$ wherein p is in the range of 0.3 to 2.2.

The anode active material of the invention is obtained by inserting lithium ions into the above precursor for the anode active material and is different in crystal structure (i.e., X-ray diffractogram) from the precursor.

In the above formulae (e.g., $Li_pMO_j$) of the precursor, the total number of transition metal is "1" and therefore the number may be multiplied by integer in the case of representing a crystallographic composition formula corresponding to the formula or in the case of having plural metals.

As is described above, the anode active material of the invention is obtained by inserting lithium ions into the precursor for the anode active material. Therefore, the anode active material corresponds to the precursor for the anode active material in which $L_p$ is changed to $L_x$ (x generally is in the range of 0.17 to 11.25, and mole number of inserted lithium ions is expressed by "x" minus "p").

The anode active material of the invention preferably is a transition metal oxide represented by $Li_xMO_j$ wherein M is at least one transition metal at least of which one is selected from the group consisting of Ti, V, Mn, Co, Fe, Ni, Cr, Nb and Mo, x is in the range of 0.17 to 11.25 and j is in the range of 1.6 to 4.1. x preferably is in the range of 0.26 to 9.9 and more preferably in the range of 0.34 to 9.1. Such anode active material is obtained by inserting lithium ions in the precursor for the anode active material represented by the above formula $Li_pMO_j$.

Further, the anode active material more preferably is a transition metal oxides represented by $Li_xM_qV_{1-q}O_j$ wherein M is a transition metal, x is in the range of 0.17 to 11.25, q is in the range of 0 to 0.7, and j is in the range of 1.3 to 4.1. x preferably is in the range of 0.26 to 9.9 and more preferably in the range of 0.34 to 9.1.

The anode active material is obtained by inserting lithium ions into the precursor for the anode active material (i.e., a transition metal oxide or a lithium-containing transition metal oxide), in the following manner. For example, the oxide is caused to react with lithium metal, lithium alloy or lithium butylate, or lithium ion is electrochemically inserted into the oxide.

In the invention, the method of electrochemically inserting lithium ions is preferred. Particularly, it is preferred to electrochemically insert lithium ions into the oxide using a lithium-containing transition metal oxide as the precursor for the anode active material. As the method of electrochemically inserting lithium ions, there can be mentioned a method of discharging a battery of an oxidation-reduction system (e.g., open system (electrolysis) or closed system (battery)) which comprises the aimed lithium-containing transition metal oxide (corresponding to the anode active material) as a cathode active material, lithium metal as an anode active material and a non-aqueous electrolyte containing lithium salt. As the preferred method, there can be mentioned a method of a battery of charging an oxidation-reduction system (e.g., open system (electrolysis) or closed system (battery)) which comprises the lithium-containing transition metal oxide as a cathode active material, the (lithium-containing) transition metal oxide as an anode active material having a different formula from that of the cathode active material and a non-aqueous electrolyte containing lithium salt.

The anode active material generally is obtained by electrochemically inserting lithium ions in the transition metal oxide of the precursor for the anode active material in the amount of 27 to 1340 mAh (corresponding to 1 to 50 mmole) per 1 g of the oxide. The amount of the lithium ions preferably is in the range of 40 to 1070 mAh (1.5 to 40 mmole), and more preferably in the range of 54 to 938 mAh (2 to 35 mmole).

The ratio of the anode active material and the cathode active material (mentioned later) generally is set up so as to equal each effective equivalent (the effective equivalent means equivalent capable of keeping cycle characteristics). In this case, it is preferred to use either of the materials in more amount than the other.

Cut-off voltage for charge-discharge cycle preferably is voltage that can discharge high voltage and essentially keep cycle characteristic.

The anode active material (having crystal structure different from that of the precursor for the anode active material) prepared in the above manner, generally has strength of one fifth or less based on strength of a maximum peak of the transition metal oxide prior to insertion of lithium ions, said maximum peak being observed in X-ray diffractogram at the diffraction angle of 5 to 70 degree using Cu-Kα ray. Further, the anode active material preferably has the strength of one tenth or less, and more preferably the strength of one twentieth. The strength of "0" means that the precursor for the anode active material is essentially all converted into the anode active material. The location of the "0" almost corresponds to that of the base line of the X-ray diffractogram. Further, it is preferred that at least one peak other than the maximum peak disappears from the diffractogram or at least one new peak appear in the diffractogram.

The anode active material of the invention generally comprises lithium-containing transition metal oxide, and is characterized by X-ray diffractogram wherein each peak strength observed in X-ray diffractogram at the diffraction angle of 5 to 70 degree using Cu-Kα ray is in the range of 20 to 1,000 cps. The peak strength preferably is in the range of 20 to 800 cps, more preferably in the range of 20 to 500 cps, and most preferably in the range of 20 to 400 cps.

The measurement of the X-ray diffraction is performed in 40 kV and 120 mA at scanning speed of 32°/min. The maximum peak of $LiCoO_2$ used as a standard compound has signal strength of 7990 cps at 18.9°(2θ; 4.691 Å).

The above $LiCoO_2$ is, for example, prepared by mixing $Li_2CO_3$ and $CoCO_3$ at molar ratio of Li/Co=1 in a mortar, transferring the mixture into a porcelain crucible to allow it to stand at 130° C. for 1 hour, subsequently burning it at 900° C. for 6 hour, and then after cooling at 2° C./min, grinding the burned mixture to prepare a powder having mean particle size (median diameter) of approx. 7.5 μm.

In the invention, the anode active material is in the condition that said changed crystal structure is not changed during repeated charging and discharging. Such condition is described in more detail below.

The crystal structure or noncrystal structure of the anode active material is expanded or shrinked through intercalation or deintercalation of lithium ions. Although change of the bonding distance and the like of the structure derived from the above expansion or shrinkage may be produced, basis of the structure (crystal or noncrystal structure) should be not changed. In more detail, an interval of faces, which is determined from the X-ray diffractogram, may be changed in the range of −0.05 to 0.05 Å, and strength or half width of the peak may be changed.

As mentioned above, the lithium-inserted anode active material of the invention is in the condition that its X-ray diffractogram is not essentially changed by repetition of charging and discharging. For example, $LiCoVO_4$ of precursor for an anode active material has inverse-spinel structure represented by $V^{5+}(Li^+Co^{2+})O_4$. In the case that lithium ions are electrochemically inserted into the oxide, the crystalline structure is changed so that the oxide is converted into an oxide having a unknown crystal structure or noncrystal structure which gives a broad peak at interval of faces of about 2 Å. The oxide having the changed crystal structure or the noncrystal structure, i.e., the oxide of the invention, is not changed during repeated charging and discharging. The oxide of the invention has a low oxidation-reduction potential and hence the oxide is suitable as an anode active material.

The cathode active material employable for the invention may be a transition metal oxide which can intercalate and deintercalate lithium ions. Preferred is a lithium-containing transition metal oxide. The preferred lithium-containing transition metal oxides are lithium-containing transition metal oxides containing at least one selected from the group consisting of Ti, V, Mn, Cr, Ni, Fe, Co, Cu, W and Mo. The cathode active material preferably has different composition from that of the anode active material.

The lithium-containing transition metal oxide used as the cathode active material is preferably obtained by mixing a lithium compound and one or more transition metal compound(s) at ratio of the lithium compound and the total transition metal compounds (lithium compound/total transition metal compounds) of 0.3 to 2.2 by mole for subjecting them to reaction. The transition metal includes at least one metal selected from the group consisting of Ti, V, Mn, Cr, Ni, Fe, Co, W and Mo. The transition metal preferably includes at least one metal selected from the group consisting of V, Cr, Fin, Co, Ni and Fe.

The cathode active material preferably is at least one transition metal oxide represented by $Li_yMO_z$ wherein M is at least one transition metal of which at least one is selected from the group consisting of Co, Mn, Fe, Ni and V, y is in the range of 0.3 to 1.2, and z is in the range of 1.4 to 3.

The cathode active material more preferably is at least one oxide selected from the group consisting of $Li_yCoO_2$, $Li_yNiO_2$, $Li_yCo_aNi_{1-a}O_2$, $Li_yCo_bV_{1-b}O_z$, $Li_yCo_bFe_{1-b}O_2$, $Li_yMn_2O_4$, $Li_yMn_cCo_{2-c}O_4$, $Li_yMn_cNi_{2-c}O_4$, $Li_yMn_cV_{2-c}O_4$ and $Li_yMn_cFe_{2-c}O_4$, and a mixture of $Li_yMn_2O_4$ and $MnO_2$, a mixture of $Li_{2y}Mn_2O_3$ and $MnO_2$, and a mixture of $Li_yMn_2O_4$, $Li_{2y}Mn_2O_3$ and $MnO_2$, wherein y is in the range of 0.5 to 1.2, a is in the range of 0.1 to 0.9, b is in the range of 0.8 to 0.98, c is in the range of 1.6 to 1.96, and z is in the range of 2.01 to 5. Further, in the formulae, it is preferred that y is in the range of 0.7 to 1.04, a is in the range of 0.1 to 0.9, b is in the range of 0.8 to 0.98, c is in the range of 1.6 to 1.96, and z is in the range of 2.01 to 2.3.

The cathode active material most preferably is at least one oxide selected from the group consisting of $Li_yCoO_2$, $Li_yNiO_2$, $Li_yCo_aNi_{1-a}O_2$, $Li_yMn_2O_4$, and $Li_yCo_bV_{1-b}O_z$ wherein y is in the range of 0.7 to 1.1, a is in the range of 0.1 to 0.9, b is in the range of 0.9 to 0.98 and z is in the range of 2.01 to 2.3. Further, in the formulae, y preferably is in the range of 0.7 to 1.04.

The value of "y" is a value prior to charging-discharging, and varies with charging or discharging. Further, the cathode active material of the invention may be a crystalline or noncrystalline compound, and however preferably is a crystalline compound.

In the battery of the invention, the transition metal oxide used as the cathode active material preferably is different from the transition metal oxide used as the anode active material in terms of chemical formula. This means that:

1. the composition of metal elements contained in each oxide is different from each other, or
2. in the case of the combination of $Li_yCo_bV_{1-b}O_z$ (cathode active material) and $Li_pCo_qV_{1-q}O_j$ (anode active material), for example, y differs p, b differs q, and/or z differs j, and particularly b differs q, and/or z differs j.

The cathode active material and the anode active material preferably have essentially different redox potentials (the former is higher than the latter).

The cathode active material of the invention can be prepared by chemically or electrochemically introducing lithium into a transition metal oxide, or by burning a lithium compound together with a transition metal compound.

When the cathode active material is prepared by chemically inserting lithium into a transition metal oxide, it is preferable that lithium metal, lithium alloy or butyl lithium is reacted with the transition metal oxide.

Preferably, the cathode active material of the invention is prepared by burning a lithium compound together with a transition metal compound.

The precursor for the anode active material of the invention can be also obtained by chemically inserting lithium into a transition metal oxide through solution reaction, or by burning the mixture of the lithium compound and transition metal compound. The anode active material preferably is prepared by the burning.

The burning may be conducted in any temperature range capable of decomposing or melting the mixture employed for the invention. For example, the burning is preferably conducted at a temperature of 250° to 2,000° C., and more preferably at 350° to 1,500° C. Further, the burning may be carried out in any gas atmosphere. However, the cathode active material is preferably burned in air or gas containing oxygen in an amount more than the other gases (e.g., not less than about 30%), and the precursor for the anode active material preferably is burned in air or gas containing oxygen in an amount less than the other gas (e.g., not more than about 10%) or in an inert gas (e.g., nitrogen gas or argon gas).

For example, in burning of a mixture of a lithium compound, a vanadium compound and a cobalt compound, a low active material such as $LiVO_3$ or $Li3VO_4$ is sometimes produced. The precursor for the anode active material may contain such low active material but the low active material may be removed if desired.

The precursor for the anode active materials or the cathode active material employable for the invention preferably is obtained by burning the mixture of the following lithium compounds and transition metal compounds. Examples of lithium compounds are oxygen compounds, oxyacid salts and halogenates. Examples of the transition metal compounds are oxides, salts and complex salts of transition metals having valences of (I)–(VI).

Preferred examples of lithium compounds employable for the invention include lithium oxide, lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium tetraboronate, lithium hexafluorophosphate, lithium fluoride, lithium chloride, lithium bromide and lithium iodide.

Preferred examples of the transition metal compounds employable for the invention include $TiO_2$, lithium titanate, acetylacetonatotitanium, titanium tetrachloride, titanium tetraiodide, titanyl ammonium oxalate, $VO_d$ (d=2 to 2.5; compound of d=2.5 is vanadium pentaoxide), lithium compounds of $VO_d$, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, acetylacetonatochromium, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, acetylacetonate manganese, iron(II) oxide, iron(III) oxide, tri-iron tetroxide, iron(II) hydroxide, iron(III) hydroxide, iron (II) chloride, iron(III) chloride, iron(II) bromide, iron (III) bromide, iron(II) iodide, iron(III) iodide, iron(II) sulfate, iron(III) sulfate, ammonium iron(II) sulfate, ammonium iron(III) sulfate, iron(II) nitrate, iron(III) nitrate, iron(II) phosphate, iron(III) phosphate, iron perchlorate, iron chlorate, iron(II) acetate, iron(III) acetate, iron(II) citrate, iron(III) citrate, ammonium iron(II) citrate, ammonium iron(III) citrate, iron(II) oxalate, iron(III) oxalate, ammonium iron(II) oxalate, ammonium iron(III) oxalate, $CoO$, $Co_2O_3$, $Co_3O_4$, $LiCoO_2$, cobalt carbonate, basic cobalt carbonate, cobalt hydroxide, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexamminecobalt complex salts (sulfate, nitrate, perchlorate, thiocyanate, oxalate, acetate, fluoride, chloride, bromide and iodide), nickel oxide, nickel hydroxide, nickel carbonate, basic nickel carbonate, nickel sulfate, nickel nitrate, nickel fluoride, nickel chloride, nickel bromide, nickel iodide, nickel formate, nickel acetate, acetylacetonatonickel, copper(I) oxide, copper(II) oxide, copper hydroxide, copper sulfate, copper nitrate, copper phosphate, copper fluoride, copper chloride, ammonium copper chloride, copper bromide, copper iodide, copper formate, copper acetate, copper oxalate, copper citrate, niobium oxychloride, niobium pentachloride, niobium penta iodide, niobium monoxide, niobium dioxide, niobium trioxide, niobium pentaoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium molybdophosphate, acetylacetonatomolybdenum oxide, $WO_2$, $WO_3$, tungstic acid, ammonium tungstate and ammonium tungstphosphate.

Particularly preferred examples of transition metal compounds employable for the invention include $TiO_2$, titanyl ammonium oxalate, $VO_d$ (d=2–2.5), lithium compounds of $VO_d$, ammonium metavanadate, $MnO_2$, $Mn_2O_3$, manganese hydroxide, manganese carbonate, manganese nitrate, ammonium manganese sulfate, manganese acetate, manganese oxalate, manganese citrate, iron(II) oxide, iron(III) oxide, tri-iron tetroxide, iron(II) hydroxide, iron(III) hydroxide, iron(II) acetate, iron(III) acetate, iron(II) citrate, iron(III) citrate, ammonium iron(II) citrate, ammonium iron(III) citrate, iron(II) oxalate, iron(III) oxalate, ammonium iron(II) oxalate, ammonium iron(III) oxalate, CoO, $Co_2O_3$, $Co_3O_4$, LiCoO., cobalt carbonate, basic cobalt carbonate, cobalt hydroxide, cobalt oxalate, cobalt acetate, nickel oxide, nickel hydroxide, nickel carbonate, basic nickel carbonate, nickel sulfate, nickel nitrate, nickel acetate, copper(I) oxide, copper(II) oxide, copper hydroxide, copper acetate, copper oxalate, copper citrate, $MoO_3$, $MoO_2$, $LiMo_2O_4$, $WO_2$ and $WO_3$.

Particularly preferred is the combination of the lithium compounds such as lithium oxide, lithium hydroxide, lithium carbonate and lithium acetate, and the transition metal compounds such as $VO_d$ (d=2–2.5), lithium compounds of $VO_d$, ammonium metavanadate, $MnO_2$, $Mn_2O_3$, manganese hydroxide, manganese carbonate, manganese nitrate, iron(II) oxide, iron(III) oxide, tri-iron tetroxide, iron(II) hydroxide, iron(III) hydroxide, iron(II) acetate, iron(III) acetate, iron(II) citrate, iron(III) citrate, ammonium iron(II) citrate, ammonium iron(III) citrate, iron(II) oxalate, iron(III) oxalate, ammonium iron(II) oxalate, ammonium iron(III) oxalate, CoO, $CoO_2O_3$, $Co_3O_4$, $LiCoO_2$, cobalt carbonate, basic cobalt carbonate, cobalt hydroxide, cobalt sulfate, cobalt nitrate, nickel oxide, nickel hydroxide, nickel carbonate, basic nickel carbonate, nickel sulfate, nickel nitrate, nickel acetate, $MoO_3$, $MoO_2$, $LiMo_2O_4$ and $WO_3$.

In burning of the lithium compounds and the transition metal compounds, there can be employed the following compounds together with the above compounds. The compounds can be compounds containing $Ca^{2+}$ which are capable of increasing ionic conductive property such as calcium carbonate, calcium chloride, calcium oxide, calcium hydroxide, calcium sulfate, calcium nitrate, calcium acetate, calcium oxalate, calcium citrate and calcium phosphate. Also employable are agents (e.g., compound containing P, B or Si) for forming noncrystalline structure such as $P_2O_5$, $Li_3PO_4$, $H_3BO_3$ and $SiO_2$; and compounds containing alkaline metal ions such as Na, K and Mg and/or elements such as Sn, Al, Ga, Ge, Ce, In and Bi (e.g., oxides thereof, hydroxides thereof, carbonates thereof and nitrates thereof). Preferred are calcium carbonate and $P_2O_5$. The compound preferably is used in the amount of 0.2 to 10 molar %.

The precursor for the anode active material and the cathode active material preferably have a mean grain size of 0.03 to 50 μm. The material having the above grain size can be prepared using a known grinder or classifier. Examples of the grinder or classifier include mortar, ball mill, vibrating ball mill, satellite ball mill, spinning air jet mill and sieve.

Each formula of the compounds prepared by burning is determined by ICP (Inductively Coupled Plasma) emission spectrometry or by the simple method in which the compound is weighed before and after burning and the content of the prepared compound is calculated from the difference of the weight.

The anode active material and the cathode active material of the invention, which are prepared in the above manner, is thought to be a compound that their valences are varied with intercalation or deintercalation of lithium ions. Therefore, the anode active material of the invention is basically different from a metal-anode active material such as lithium metal or lithium alloy which is dissolved or deposited through charging and discharging. Further, the material of the invention is also different from a carbonaceous material. In more detail, the carbonaceous material is not a compound that can change valence, and the material has high conductive property and brings about deposition of lithium during charging and discharging. Thus, the anode active material of the invention is a compound of different type from the the metal material and the carbonaceous material.

Examples of materials which can be employed together with anode active material of the invention include: lithium metal, lithium alloys (e.g., Al, Al—Mn [U.S. Pat. No. 4,820,599], Al—Mg [Japanese Patent Provisional Publication No. 57(1982)-98977], Al—Sn [Japanese Patent Provisional Publication No. 63(1988)-6742], Al—In, Al—Cd [Japanese Patent Provisional Publication No. 1(1989)-144573), and burned carbonaceous materials in which lithium ion can be intercalated and deintercalated (Japanese Patent Provisional Publication Nos. 58(1983)-209864, 61(1986)-214417, 62(1987)-88269, 62(1987)-216170, 63(1988)-13282, 63(1988)-24555, 63(1988)-121247, 63(1988)-121257, 63(1988)- 155568, 63(1988)-276873, 63(1988)-314821, 1(1989)-204361, 1(1989)-221859 and 1(1989)-274360).

The above lithium metal or lithium alloy is used for inserting lithium ions into a battery and is not used for dissolving or depositing lithium metal.

Binders, electrically conductive agents, and/or filers may be added to a mixture for electrode (anode or cathode) (i.e., depolarizing mix for electrode).

Examples of the electrically conductive agents include natural graphite (e.g., flaky graphite, flake graphite and amorphous graphite), artificial graphite, acetylene black, furnace black, ketjen black, carbon fiber, metal powder (e.g., Cu, Ni, Al or Ag (Japanese Patent Provisional Publication No. 63(1988)-148554)), metal fiber and polyphenylene derivatives (Japanese Patent Provisional Publication No. 59(1984)-20971). The agents may be used singly or in combination. The graphite and acetylene black are preferably used in combination. The amount of the agent preferably is in the range of 1 to 50 weight %, and more preferably is in the range of 2 to 30 weight %. In use of carbon black a or graphite, the amount preferably is in the range of 2 to 15 weight %.

Examples of binders include natural polysaccharide, synthesized polysaccharide, synthesized polyhydroxyl compounds, thermoplastic polymers, fluorine-containing compounds and synthesized rubber. Preferred examples include starch, polyvinyl alcohol, carboxymethyl cellulose, diacetyl cellulose, hydroxylpropyl cellulose, regenerated cellulose, polyvinyl chloride, polyvinyl pyrrolidone, polytetrafluoroethylene, polyfluorovinylidene, ethylene-propylene-diene copolymer (EPDM), sulfonated EPDM, styrene-butadiene rubber, polybutadiene, fluororubber and polyethylene oxide. The polymers may be used singly or in combination. If a polymer such as polysaccharide having a functional group that reacts with lithium is employed, it is preferred that the functional group is inactivated by reacting the group with a compound such as isocyanate compound. The amount of the polymer preferably is in the range of 1 to 50 weight %, and more preferably is in the range of 2 to 30 weight %.

Examples of the filers employable for the invention include fibers of olefin polymers such as polypropylene and polyethylene, glass and carbon. The amount of the filer preferably is in the range of 0 to 30 weight %.

The electrolytic conductor comprises a solvent containing at least one aprotic organic solvent, and one or more lithium salts (comprising anion and lithium cation) which are soluble in the solvent.

Examples of the aprotic organic solvent include propylene carbonate, ethylene carbonate, butylene carbonate, dimethyl carbonate, diethylcarbonate, γ-butyrolactone, methyl formate, methyl acetate, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, ethylmonoglyme, phosphoric acid triester (Japanese Patent Provisional Publication No. 60(1985)-23973), trimethoxymethane (Japanese Patent Provisional Publication No. 61(1986)-4170), dioxolan derivatives (Japanese Patent Provisional Publication Nos. 62(1987)-15771, 62(1987)-22372 and 62(1988)-108473), sulfolane (Japanese Patent Provisional Publication No. 62(1987)-31959), 3-methyl-2-oxazolidinone (Japanese Patent Provisional Publication No. 62(1987)-44961), propylene carbonate derivatives (Japanese Patent Provisional Publication Nos. 62(1987)-290069 and 62(1987)-290071), tetrahydrofuran derivatives (Japanese Patent Provisional Publication No. 63(1988)-32872), ethyl ether (Japanese Patent Provisional Publication No. 63(1988)-62166) and 1,3-propanesultone (Japanese Patent Provisional Publication No. 63(1988)-02173).

Examples of the lithium salt include: salts of $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^-$ (Japanese Patent Provisional Publication No. 57(1982)-74974) and $(1,2\text{-dimethoxyethane})_2ClO_4^-$ (Japanese Patent Provisional Publication No. 57(1982)-74977); lower aliphatic carboxylic acids (Japanese Patent Provisional Publication No. 60(1985)-41773); $AlCl_4^-$, $Cl^-$, $Br^-$ and $I^-$ (Japanese Patent Provisional Publication No. 60(1985)-247265); chloroborane (Japanese Patent Provisional Publication No. 61(1986)-165957); and tetraphenylborate (Japanese Patent Provisional Publication No. 61(1986)-214376).

A preferred example of the electrolyte is an electrolytic solution prepared by dissolving $LiCF_3SO_3$, $LiClO_4$, $LiBF_4$ and/or $LiPF_6$ in a mixture of propylene carbonate or ethylene carbonate and 1,2-dimethoxyethane and/or diethylcarbonate.

In the case of using both of propylene carbonate (or ethylene carbonate) and 1,2-dimethoxyethane (and/or diethylcarbonate) as solvent, the ratio of propylene carbonate or ethylene carbonate to 1,2-dimethoxyethane and/or diethylcarbonate preferably is in the range of 0.4/0.6 to 0.6/0.4, by volume. The ratio of 1,2-dimethoxyethane and diethylcarbonate preferably is in the range of 0.4/0.6 to 0.6/0.4.

The concentration of electrolyte preferably is in the range of 0.2 to 3 mole per electrolytic solution of 1 liter.

In addition to electrolytic solutions, solid electrolytes described below are also employable. Solid electrolytes can be classified into inorganic solid electrolytes and organic solid electrolytes.

As the inorganic solid electrolytes, lithium nitride, lithium halide and oxyacidic salts of lithium can be mentioned. Examples of the inorganic solid electrolytes preferably employable for the invention include $Li_3N$, $LiI$, $Li_5NI_2$, $Li_3N$-$LiI$-$LiOH$, $LiSiO_4$, $LiSiO_4$-$LiI$-$LiOH$ (Japanese Patent Provisional Publication No. 49(1974)-81899), $xLi_3PO_4$-$(1-x)Li_4SiO_4$ (Japanese Patent Provisional Publication No. 59(1984)-60866), $Li_2SiS_3$ (Japanese Patent Provisional Publication No. 60(1985)-501731) and phosphorus sulfide compounds (Japanese Patent Provisional Publication No. 62(1987)-82665).

Examples of the organic solid electrolytes employable for the invention include: polyethylene oxide derivatives and polymers containing said derivatives (Japanese Patent Provisional Publication No. 63(1988)-135447); polypropylene oxide derivatives and polymers containing said derivatives; polymers containing ion-dissociating groups (Japanese Patent Provisional Publication Nos. 62(1987)-254302, 62(1987)-254303 and 63(1988)-193954); a mixture of polymers containing ion-dissociating groups and the above-mentioned aprotic electrolytic solutions (U.S. Pat. Nos. 4,792,504 and 4,830,939, Japanese Patent Provisional Publication Nos. 62(1987)-22375, 62(1987)-22376, 63(1988)-22375, 63(1988)-22776 and 1(1989)-95117); phosphoric acid ester polymer (Japanese Patent Provisional Publication No. 61(1986)-256573); and polymer matrix material containing aprotic polar solvent (U.S. Pat. Nos. 4,822,70 and 4,830,939, Japanese Patent Provisional Publication No. 63(1988)-239779, Japanese Patent Application Nos. 2(1990)-30318 and 2(1990)-78531).

In addition to the above solid electrolytes, an electrolytic solution containing polyacrylonitrile (Japanese Patent Provisional Publication No. 62(1987)-278774) may be also employed. Further, inorganic and organic solid electrolytes may be used in combination (Japanese Patent Provisional Publication No. 60(1985)-1768).

A separator provided between the anode and the cathode is an insulated film having both high ion permeability and desired mechanical strength. A generally used separator is a porous sheet or non-woven fabric made of olefinic polymers such as polypropylene or a sheet of glass fiber, because they have hydrophobic property and resistance of organic solvent. The diameter of the aperture of the separator generally is in the range of 0.01 to 10 μm. The thickness of the separator generally is in the range of 5 to 300 μm.

The other compounds may be added into the electrolyte in order to improve characteristics in charge-discharge cycle. Examples of the compounds include pyridine (Japanese Patent Provisional Publication No. 49(1974)-108525), triethylphosphite (Japanese Patent Provisional Publication No. 47(1972)-4376), triethanolamine (Japanese Patent Provisional Publication No. 52(1977)-72425), cyclic ethers (Japanese Patent Provisional Publication No. 57(1982)-152684), ethylene diamine (Japanese Patent Provisional Publication No. 58(1983)-87777), n-glyme (Japanese Patent Provisional Publication No. 58(1983)-87778), hexaphosphoric acid triamide (Japanese Patent Provisional Publication No. 58(1983)-87779), nitrobenzene derivatives (Japanese Patent Provisional Publication No. 58(1983)-214281), sulfur (Japanese Patent Provisional Publication No. 59(1984)- 8280), quinoneimine dye (Japanese Patent Provisional Publication No. 59(1984)-68184), N-substituted oxazolidinone and N,N'-substituted imidazolidinone (Japanese Patent Provisional Publication No. 59(1984)-154778), ethylene glycol dialkyl ether (Japanese Patent Provisional Publication No. 59(1984)-205167), quaternary ammonium salts (Japanese Patent Provisional Publication No. 60(1985)-30065), polyethylene glycol (Japanese Patent Provisional Publication No. 60(1985)-41773), pyrrole (Japanese Patent Provisional Publication No. 60(1985)-79677), 2-methoxyethanol (Japanese Patent Provisional Publication No. 60(1985)-89075), $AlCl_3$ (Japanese Patent Provisional Publication No. 61(1986)-88466), monomer of the conductive polymer used as the active material (Japanese Patent Provisional Publication No. 61(1986)-161673), triethylenephosphoramide (Japanese Patent Provisional Publication No. 61(1986)-208758), trialkylphophine (Japanese Patent Provisional Publication No. 62(1987)-80976), morpholine (Japanese Patent Provisional Publication No. 62(1987)-80977), aryl compounds having carbonyl group (Japanese Patent Provisional Publication No. 62(1987)-86673), crown ethers such as 12-crown-4 (*Physical Review B*, vol.42(1990) pp.6424), hexamethylphosphoric triamide and 4-alkylmorpholine (Japanese Patent Provisional Publication No. 62(1987)-217575), bicyclic tertiary amine (Japanese Patent Provisional Publication No. 62(1987)-217578), oils (Japanese Patent Provisional Publication No. 62(1987)-287580), quaternary phosphonium salts (Japanese Patent Provisional Publication No. 63(1988)-121268) and tertiary sulfonium salts (Japanese Patent Provisional Publication No. 63(1988)-121269).

In order to render the electrolytic solution noncombustible, halogen-containing solvents such as carbon tetrachloride and ethylene chloride trifluoride may be added (Japanese Patent Provisional Publication No. 48(1972)-36632). Further, carbon dioxide may be contained in the electrolytic solution so as to give preservability at high temperatures (Japanese Patent Provisional Publication No. 59(1984)-134567).

The mixture for the cathode or anode active material may contain an electrolytic solution or an electrolyte. Examples of the materials of the electrolytic solution or electrolyte include the above-mentioned ion conductive polymers and nitromethane (Japanese Patent Provisional Publication No. 48(1973)-36633, or electrolytic solutions (Japanese Patent Provisional Publication No. 57(1982)-124870).

Otherwise, the surface of the cathode active material may be modified. For example, the surface of the metal oxide can be treated with an agent for esterification (Japanese Patent Provisional Publication No. 55(1980)-163779), a chelating agent (Japanese Patent Provisional Publication No. 55(1980)-163780), conductive polymers (Japanese Patent Provisional Publication Nos. 58(1983)-163188 and 59(1984)-14274), or polyethylene oxide (Japanese Patent Provisional Publication No. 60(1985)-97561).

Further, the surface of the anode active material may be modified. For example, a layer of ion conductive polymer or a layer of polyacetylene may be provided on the surface (Japanese Patent Provisional Publication No. 58(1983)-111276), or the surface may be treated with LiCl (Japanese Patent Provisional Publication No. 58(1983)-142771) or with ethylene carbonate (Japanese Patent Provisional Publication No. 59(1984)-31573).

As a collector, any electronic conductors can be employed unless they induce chemical reaction in the prepared battery. Examples of materials employable for the collector for the cathode generally include stainless steel, titanium, aluminium, nickel and burned carbon, and stainless steel or aluminium plated with carbon, nickel, titanium or silver thereon. Examples of materials employable for the collector for the anode generally include stainless steel, titanium, copper, aluminium, nickel and burned carbon, and stainless steel or aluminium treated with carbon, nickel, titanium or silver thereon as well as Al—Cd alloy. These surface may be oxidized. The shape of the collector include foil, film, sheet, net, punched material, lath, porous film, foam or fiber molded product. The thickness of the collector generally is in the range of 1 to 500 μm.

The above-mentioned materials can be employed for a battery of any shape such as coin-type, button-type, sheet-type, cylindrical type or square type.

In a battery of coin-type or button-type, a mixture for anode or cathode generally is compressed to form a pellet. The thickness or diameter of the pellet is determined depending upon size of battery. In a battery of sheet-type, cylindrical type or square type, a mixture for anode or cathode generally is coated on the collector, dried and compressed. As the coating method, there can be generally employed reverse roller coating, direct roller coating, blade coating, knife coating, extrusion coating, curtain coating, gravure coating, bar coating, dip coating and squeeze coating. Preferred are blade coating, knife coating and extrusion coating. The coating is preferably carried out at a rate of 0.1 to 100 m/min. By selecting a coating method suitable for properties (with respect to solution and drying) of the mixture for anode or cathode from the above coating methods, a coated layer having uniform surface can be formed. The thickness, length and width of the coated layer are generally determined depending on a size of a battery. The thickness of the coated layer, which is compressed after drying, preferably is in the range of 1 to 2,000 μm.

As methods of drying or dehydration of the pellet or sheet, there can be employed known methods. Preferred methods include those using hot air, vacuum, infrared rays, far-infrared rays, electron beam and dry air. These methods may be employed singly or in combination. Temperature for the drying or dehydration preferably is in the range of 80° to 350° C., and more preferably in the range of 100° to 250° C. The moisture content of a battery having the pellet or sheet is not more than 2,000 ppm based on the total weight of the battery. Further, each of the mixture for anode, the mixture of cathode and the electrolyte preferably has moisture content of not more than 500 ppm in terms of cycle characteristics.

As the pressing methods of the pellet or sheet, there can be employed known methods. Preferred are a mold press method and a calendering method. Pressure for pressing preferably is in the range of 0.2 to 3 t/cm$^2$. Pressing rate of the calendering method preferably is in the range of 0.1 to 50 m/min and pressing temperature preferably is in the range of room temperature to 200° C.

The sheet of the mixture is rolled or bended to be inserted into a can and joined to the can. Subsequently, an electrolytic solution is injected into the can, and then the can is sealed up with a plate for seal to prepare a battery of a can. In the battery, a safety valve may be substituted for the plate for seal. The battery may be provided with known various safety elements other than the safety valve. For example, there can be mentioned elements for preventing overcurrent such as fuze, bimetal and PTC (positive temperature coefficient) element. Further, in order to depress increase of pressure in the can, a method of partially cutting the can, an undercut gasket method or a method of undercutting a plate for sheet may be employed. Furthermore, a charger for charging may have a circuit which can prevent overcharge or overdischarge.

As materials for a can or a lead plate, there can be mentioned metals and alloys which have electric conductive property. Examples of the materials include metals such as iron, nickel, titanium, chromium, molybdenum, copper and aluminium, and alloys thereof. A cap (for joining), a can, sheet and a lead plate are welded each other according to known molding methods (e.g., electric weld of D.C. or A.C., laser weld and ultrasonic weld). As seal agents used for the plate for seal, there can be mentioned known compounds or mixtures such as asphalt.

The following examples further illustrate the present invention, but these examples by no means restrict the invention.

EXAMPLE 1

A mixture for cathode was prepared by mixing each of LiCoO$_2$ as the cathode active material (82 wt. %), flake graphite as conductive agent (12 wt. %) and polytetrafluoroethylene as binder (6 wt. %). The obtained mixture was molded under compression to prepare a cathode pellet (diameter:13 mm, 0.35 g). The pellet was sufficiently dehydrated using a heater of far-infrared rays in a drying box (dew point of −40° to 70° C., dried air). The resultant pellet was used as a cathode material.

Independently, a mixture for anode was prepared by mixing each of the precursor for the anode active material indicated in Table 1 (82 wt. %), flake graphite as conductive agent (12 wt. %) and polyfluorovinylidene as binder (6 wt. %). The obtained mixture was molded under compression to prepare an anode pellet (diameter:13 mm, 0.060 g). The pellet was sufficiently dehydrated in the above drying box. The resultant pellet was used as a anode material.

As the collector, a net of SUS316 having thickness of 80 μm was used. Each net for anode and cathode was welded to a coin can.

As the nonaqueous electrolyte, 1 mol/L electrolytic solution of $LiPF_6$ (dissolved in a solvent which was prepared by mixing equal volumes of ethylene carbonate and diethyl carbonate) was used in the amount of 250 μL. A porous sheet of polypropylene and non-woven fabric of polypropylene were used as separators. The non-woven fabric was soaked with the electrolytic solution.

Figure 1:
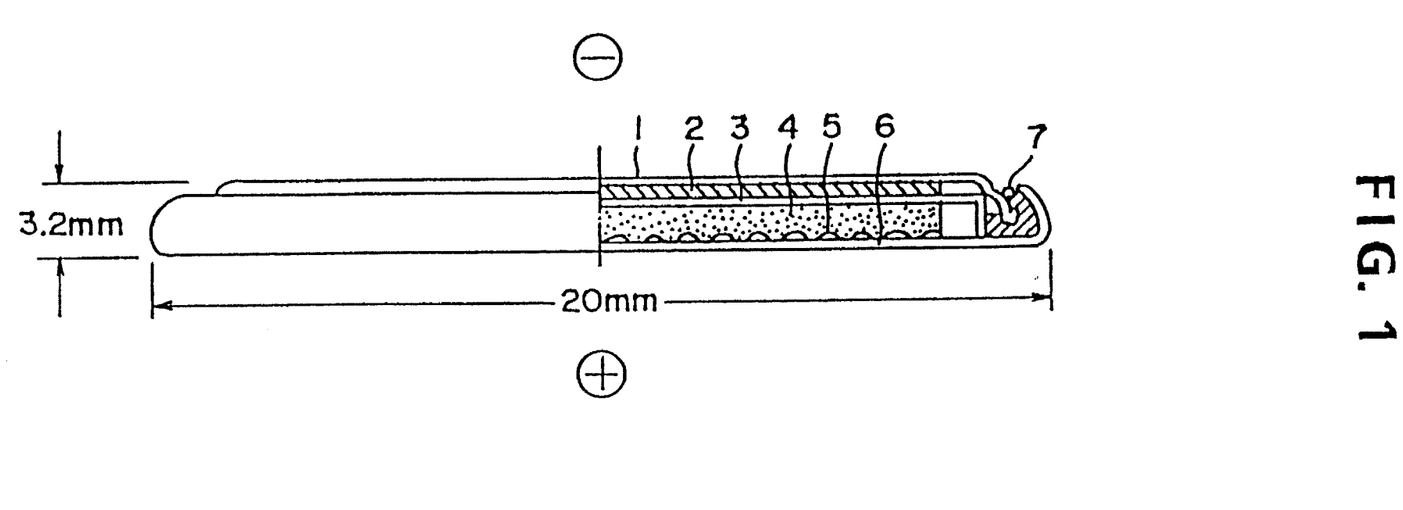
FIG. 1 is a schematic sectional view of a typical battery of coin-type according to the invention.

A secondary battery of coin-type shown in FIG. 1 was produced using the resultant elements in the above drying box.

In FIG. 1, the anode pellet 2 is sealed between the anode seal 1 and the separator 3, the cathode seal 1 is sealed between the cathode case 6 having the collector 5 and the separator 3, and the gasket 7 is provided between the outer periphery of the anode seal 1 and that of the gasket 7.

In all samples indicated in Table 1, each of the materials for the anode active material was prepared by burning each of the materials ((i) and (ii)) indicated in Tables 1a and 1b in air at 800° C. for 6 hours.

TABLE 1a

| Sample No. | (i) Lithium compound | (ii) Transition metal | (iii) (i)/(ii) by mole | (iv) Ratio of (ii) |
|---|---|---|---|---|
| 1 | b | c | 1 | — |
| 2 | a | h | 1 | — |
| 3 | — | c/d | 0 | 0.5/0.5 |
| 4 | b | c/d | 0.5 | 0.5/0.5 |
| 5 | b | c/d | 1 | 0.5/0.5 |
| 6 | b | c/e | 0.5 | 0.5/0.5 |
| 7 | b | c/e | 0.75 | 0.5/0.5 |
| 8 | b | c/e | 1.75 | 0.5/0.5 |
| 9 | a | c/h | 1 | 0.5/0.5 |
| 10 | a | g/h | 1 | 0.5/0.5 |
| 11 | a | f/g | 1 | 0.5/0.5 |
| 12 | b | c/d | 1 | 0.75/0.25 |
| 13 | b | c/e | 1 | 0.75/0.25 |
| 14 | a | c/e | 1 | 0.95/0.05 |
| 15 | a | c/f | 1 | 0.95/0.05 |
| 16 | a | c/g | 1 | 0.95/0.05 |
| 17 | a | c/i | 1 | 0.95/0.05 |
| 18 | b | c/d | 1 | 0.25/0.75 |
| 19 | a | c/g/h | 1 | 0.25/0.25/0.5 |

Note;
(i): Lithium compound
(ii): Transition metal compound
(iii): Lithium compound/Total transition metal compounds ((i)/(ii), by mole)
(iv): Ratio of Transition metal compounds (by mole)
Example of (i) Lithium compound, (ii) Transition metal compound and the others:
(a) LiOH
(b) $Li_2CO_3$
(c) $NH_4VO_3$
(d) $CoCO_3$
(e) $NiCO_3 \cdot 2Ni(OH)_2 \cdot 4H_2O$ TABLE 1a-continued

| Sample No. | (i) Lithium compound | (ii) Transition metal | (iii) (i)/(ii) by mole | (iv) Ratio of (ii) |
|---|---|---|---|---|

(f) $Fe(C_2O_4)_2 \cdot 2H_2O$
(g) $MnCO_3$
(h) $(NH_4)_2TiO(C_2O_4)_2 \cdot 2H_2O$
(i) $CaCO_3$
(j) $P_2O_5$
(k) $LiCoO_2$
(l) $LiCo_{0.5}Ni_{0.5}O_2$
(m) $LiCo_{0.95}V_{0.05}O_{2.07}$
(n) $LiMn_2O_4$ TABLE 1b

| Sample No. | (v) Precursor of anode active material | (vi) After charging (x of $Li_x$) | (vii) After discharging (x of $Li_x$) |
|---|---|---|---|
| 1 | $LiVO_{3.1}$ | 5.6 | 4.8 |
| 2 | $LiTiO_{2.3}$ | 4.8 | 4.1 |
| 3 | $CoVO_{3.7}$ | 5.2 | 3.7 |
| 4 | $LiCoVO_{4.0}$ | 5.8 | 2.8 |
| 5 | $LiCo_{0.5}V_{0.5}O_{2.1}$ | 5.8 | 4.2 |
| 6 | $LiNiVO_{4.0}$ | 5.6 | 4.2 |
| 7 | $Li_{0.75}Ni_{0.5}V_{0.5}O_{2.1}$ | 5.3 | 3.8 |
| 8 | $Li_{1.75}Ni_{0.5}V_{0.5}O_{2.4}$ | 5.0 | 4.0 |
| 9 | $LiTi_{0.5}V_{0.5}O_{2.9}$ | 3.4 | 2.5 |
| 10 | $LiMn_{0.5}V_{0.5}O_{2.5}$ | 4.2 | 3.2 |
| 11 | $LiFe_{0.5}Mn_{0.5}O_{2.1}$ | 4.8 | 3.4 |
| 12 | $LiCo_{0.25}V_{0.75}O_{2.8}$ | 4.9 | 4.1 |
| 13 | $LiNi_{0.25}V_{0.75}O_{2.7}$ | 4.8 | 3.2 |
| 14 | $LiNi_{0.05}V_{0.95}O_{3.1}$ | 5.6 | 4.6 |
| 15 | $LiFe_{0.05}V_{0.95}O_{3.1}$ | 5.5 | 4.6 |
| 16 | $LiMn_{0.05}V_{0.95}O_{3.0}$ | 5.4 | 4.5 |
| 17 | $LiCa_{0.05}V_{0.95}O_{3.2}$ | 5.8 | 4.3 |
| 18 | $LiCo_{0.75}V_{0.25}O_{1.9}$ | 3.2 | 2.9 |
| 19 | $LiMn_{0.25}Ti_{0.5}V_{0.25}O_{2.6}$ | 4.6 | 3.5 |

Note;
(v): Precursor of anode active material
(vi): x of $Li_x$ of anode active material (($Li_xMO_j$); M: transition metal) after charging of first cycle
(vii): X of $Li_x$ of anode active material (($Li_xMO_j$); M: transition metal) after charging and discharging of first cycle The charging and discharging were carried out in the same manner as the following charging-discharging test.

Samples of Example 1 were evaluated in the following manner:

The charging-discharging test was carried out by iteratively charging and discharging at current density of 0.75 $mA/cm^2$ in the range of from 3.9 to 1.8 V. The test started from charging.

In the test, (viii) discharging capacity at the second cycle (mAh per precursor for anode active material of 1 g), (ix) coulomb efficiency at the second cycle (%), (x) mean discharging voltage at the second cycle (V), and (xi) the number of cycles when discharging capacity reaches 60% of the maximum capacity, were measured.

The results are set forth in Table 2.

TABLE 2

| Sample No. | (viii) Capacity of 2nd cycl (mAh) | (ix) Coulomb Efficiency (%) | (x) Mean Voltage (V) | (xi) Number of Cycles |
|---|---|---|---|---|
| 1 | 95 | 74 | 2.8 | 20 |
| 2 | 75 | 78 | 3.0 | 20 |
| 3 | 158 | 70 | 2.6 | 15 |

TABLE 2-continued

| Sample No. | (viii) Capacity of 2nd cycl (mAh) | (ix) Coulomb Efficiency (%) | (x) Mean Voltage (V) | (xi) Number of Cycles |
|---|---|---|---|---|
| 4 | 400 | 77 | 3.0 | 35 |
| 5 | 200 | 86 | 2.7 | 40 |
| 6 | 183 | 85 | 2.8 | 40 |
| 7 | 193 | 93 | 2.7 | 40 |
| 8 | 129 | 98 | 2.6 | 80 |
| 9 | 94 | 88 | 2.9 | 40 |
| 10 | 86 | 97 | 2.8 | 50 |
| 11 | 171 | 45 | 2.2 | 10 |
| 12 | 113 | 95 | 2.9 | 80 |
| 13 | 186 | 95 | 2.8 | 60 |
| 14 | 102 | 82 | 2.9 | 40 |
| 15 | 96 | 82 | 3.0 | 40 |
| 16 | 102 | 95 | 2.8 | 50 |
| 17 | 217 | 90 | 2.7 | 35 |
| 18 | 30 | 73 | 2.2 | 15 |
| 19 | 137 | 96 | 2.7 | 45 |

EXAMPLE 2

The procedures of Sample 5 of Example 1 were repeated except for burning the materials in air at 900° C. for 6 hours (Sample 20), in argon gas at 900° C. for 6 hours (Sample 21) and in air at 660° C. for 6 hours (Sample 22), instead of in air at 800° C. for 6 hours. With respect to the obtained battery, the same test as described in Example 1 was carried out.

The results are set forth in Table 3.

TABLE 3

| Sample No. | Burning Condition | (vii) Capacity 2nd cycl (mAh) | (viii) of Coulomb Efficiency (%) | (ix) Mean Voltage (V) | (x) Number of Cycles |
|---|---|---|---|---|---|
| 20 | 900° C./6h/air | 254 | 90 | 2.8 | 40 |
| 21 | 900° C./6h/Ar | 222 | 87 | 2.7 | 40 |
| 22 | 660° C./6h/air | 300 | 98 | 2.8 | 60 |

EXAMPLE 3

The procedures of Sample 5 of Example 1 were repeated except for further adding $P_2O_5$ to the materials for the anode active material of Sample 5 (Samples 23 and 24). Samples 23 is the same as Sample 5. With respect to the obtained battery, the same test as described in Example 1 was carried out.

The results are set forth in Table 4.

TABLE 4

| Sample No. | Content of $P_2O_5$ (molar %) | (vii) Capacity 2nd cycl (mAh) | (viii) of Coulomb Efficiency (%) | (ix) Mean Voltage (V) | (x) Number of Cycles |
|---|---|---|---|---|---|
| 23(5) | 0 | 200 | 86 | 2.7 | 40 |
| 24 | 0.5 | 251 | 90 | 2.8 | 50 |

EXAMPLE 4

The procedures of Sample 4 of Example 1 were repeated except for using compounds (k), (m), (n) and (n) mentioned above as the cathode active material instead of compound (k) (Samples 25 and 28). Sample 25 is the same as Sample 4. With respect to the obtained battery, the same test as described in Example 1 was carried out.

The results are set forth in Table 5.

TABLE 5

| Sample No. | Cathode Active Material | (vii) Capacity 2nd cycl (mAh) | (viii) of Coulomb Efficiency (%) | (ix) Mean Voltage (V) | (x) Number of Cycles |
|---|---|---|---|---|---|
| 25(4) | k | 400 | 77 | 3.0 | 35 |
| 26 | 1 | 250 | 85 | 2.8 | 45 |
| 27 | m | 232 | 92 | 2.9 | 55 |
| 28 | n | 151 | 95 | 3.0 | 65 |

EXAMPLE 5

The procedures of Sample 5 of Example 1 were repeated except for using composite prepared (through inserting lithium ions) by superposing a thin plate of lithium metal (6 mg) on the precursor for anode active material of Sample 5 as a precursor for anode active material to prepare a secondary battery of coin-type (Sample 29).

With respect to the obtained battery, the same test as described in Example 1 was carried out.

The results are set forth in Table 6.

TABLE 6

| Sample No. | (vii) Capacity of 2nd cycl (mAh) | (viii) Coulomb Efficiency (%) | (ix) Mean Voltage (V) | (x) Number of Cycles |
|---|---|---|---|---|
| 29 | 202 | 87 | 2.8 | 40 |

COMPARISON EXAMPLE 1

The procedures of Example 1 were repeated except for using $WO_2$ of rutile type (Sample 30), $Fe_3O_4$ of spinel type (Sample 31), and $LiNi_{0.5}Co_{0.5}O_2$ of (Sample 32) as the precursor for anode active material to prepare secondary batteries of coin-type. With respect to the obtained batteries (Samples 30 and 31), the same test as described in Example 1 was carried out. with respect to the obtained battery (Samples 32), the charging-discharging test was carried out by iteratively charging and discharging at current density of 0.75 mA/cm² in the range of from 2.5 to 1.5 V. The test started from charging.

The results are set forth in Table 7.

TABLE 7

| Sample No. | Anode Active Material | (vii) Capacity 2nd cycl (mAh) | (viii) of Coulomb Efficiency (%) | (ix) Mean Voltage (V) | (x) Number of Cycles |
|---|---|---|---|---|---|
| 30 | $WO_2$ | 55 | 65 | 2.4 | 10 |
| 31 | $Fe_2O_4$ | 600 | 78 | 2.3 | 6 |
| 32 | $LiNi_{0.5}Co_{0.5}O_2$ | 115 | 80 | 1.7 | 20 |

Subsequently, obtained batteries were evaluated by X-ray diffractograms.

Figure 2:
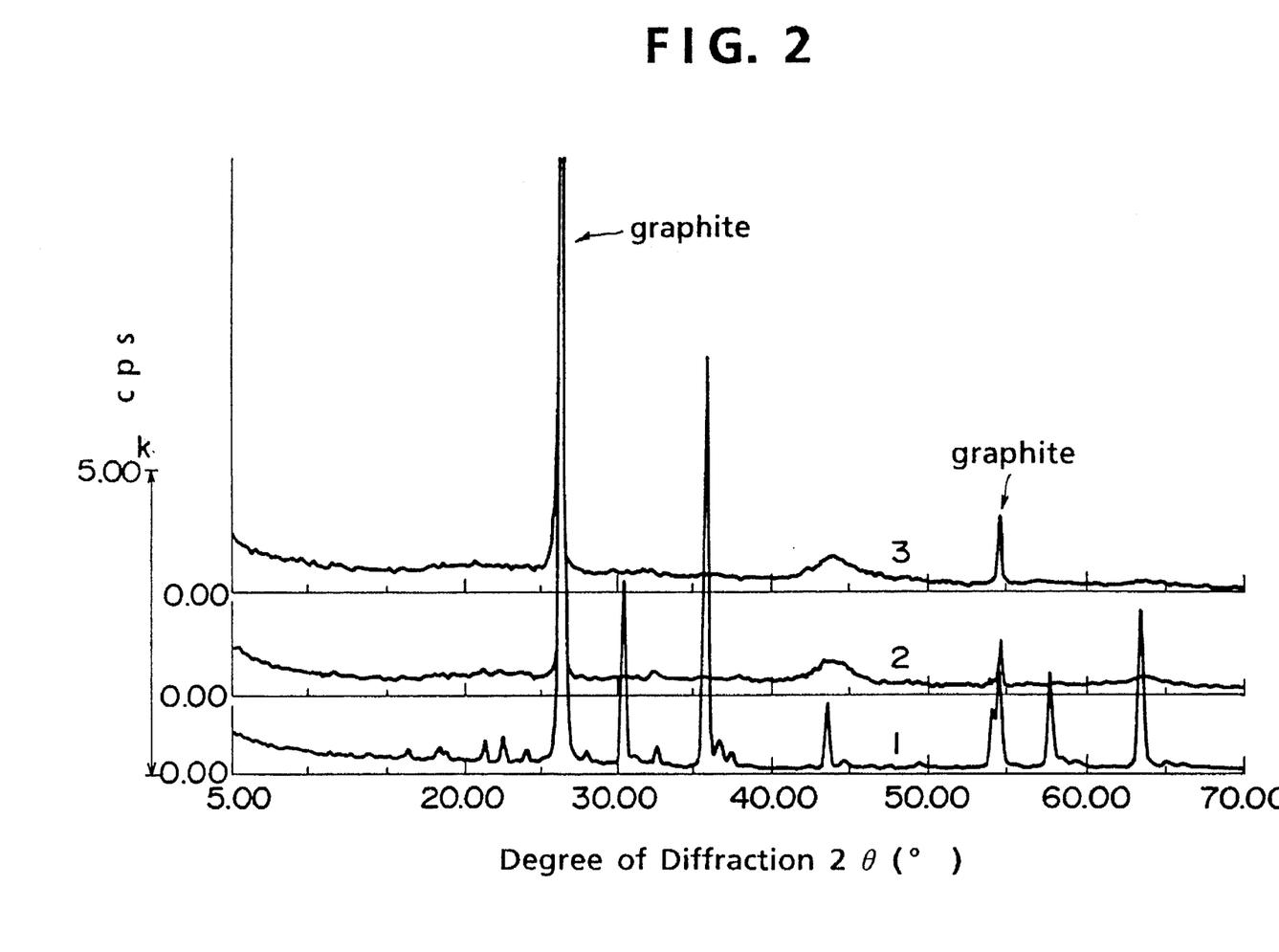
FIG. 2 shows X-ray diffractograms of the anode active material (prior to charging (prior to insertion of lithium), after one charge-discharge cycle and after 10 charge-discharge cycles) used for Sample 4 of Example 1.

(1) X-ray diffractograms of the precursor for the anode active material, the anode active material of Sample 4 of Example 1 (at 1.8 V) that the precursor underwent 1 cycle of charging-discharging and the anode active material (at 1.8 V) that the precursor underwent 10 cycles of charging-discharging, were measured. The obtained X-ray diffractograms are shown in FIG. 2. The X-ray diffractogram of the precursor of the anode active material is designated by "1" of FIG. 2, that of the anode active material after 1 cycle is designated by "2" and that of the anode active material after 10 cycles is designated by "3".

Figure 3:
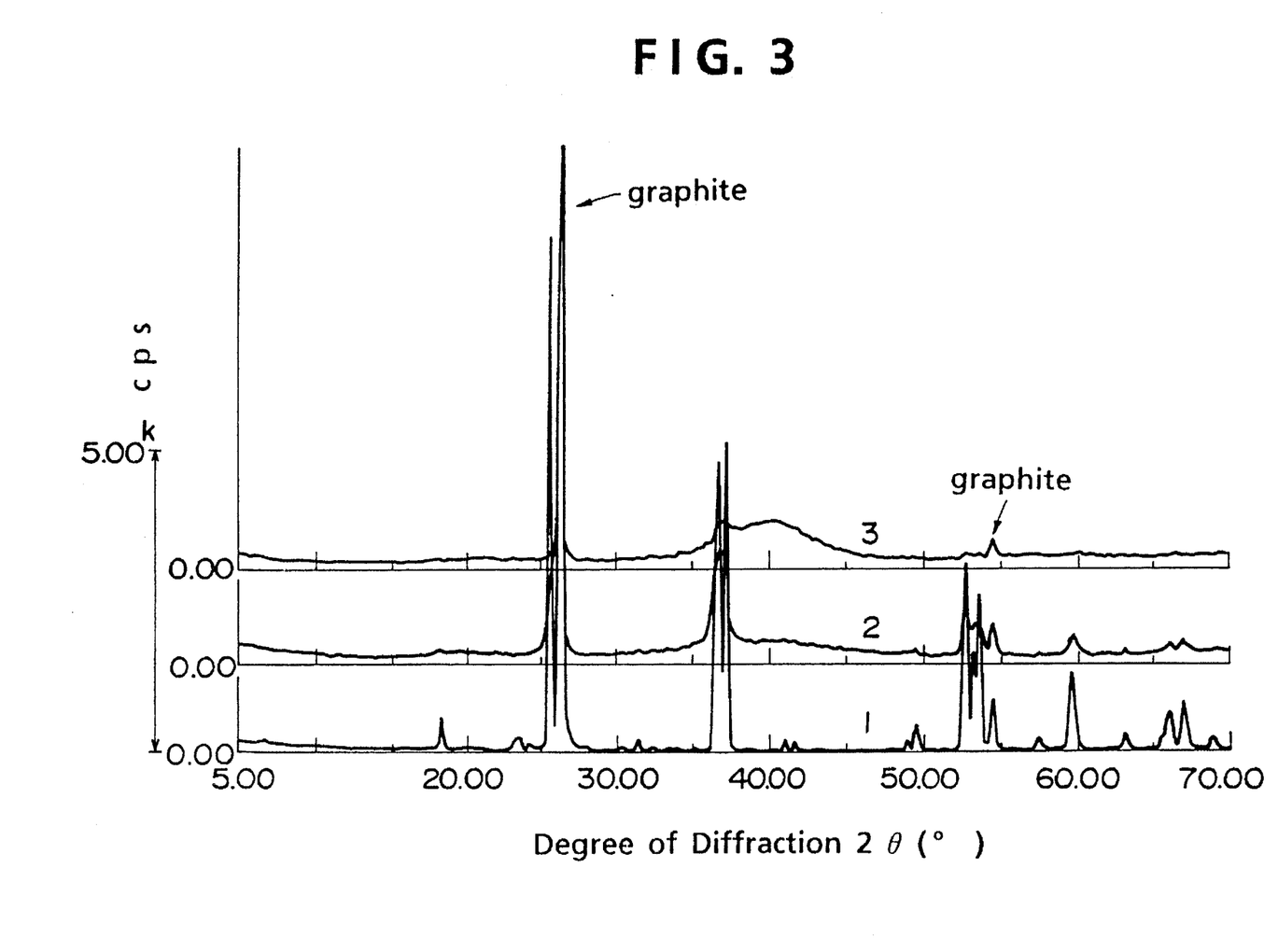
FIG. 3 shows X-ray diffractograms of the anode active material (rutile type-$WO_2$; prior to charging, after one charge-discharge cycle and after 10 charge-discharge cycles) used for Sample 30 of Comparison Example 1.

(2) X-ray diffractograms of the precursor for the anode active material of $WO_2$ of rutile type (Sample 30), the anode active material (at 1.8 V) that the precursor underwent 1 cycle of charging-discharging and the anode active material (at 1.8 V) that the precursor underwent 10 cycle of charging-discharging, were measured. The obtained X-ray diffractograms are shown in FIG. 3. The X-ray diffractogram of the precursor of the anode active material is designated by "1" of FIG. 3, that of the anode active material after 1 cycle is indicated by "2" and that of the anode active material after 10 cycles is indicated by "3".

Figure 4:
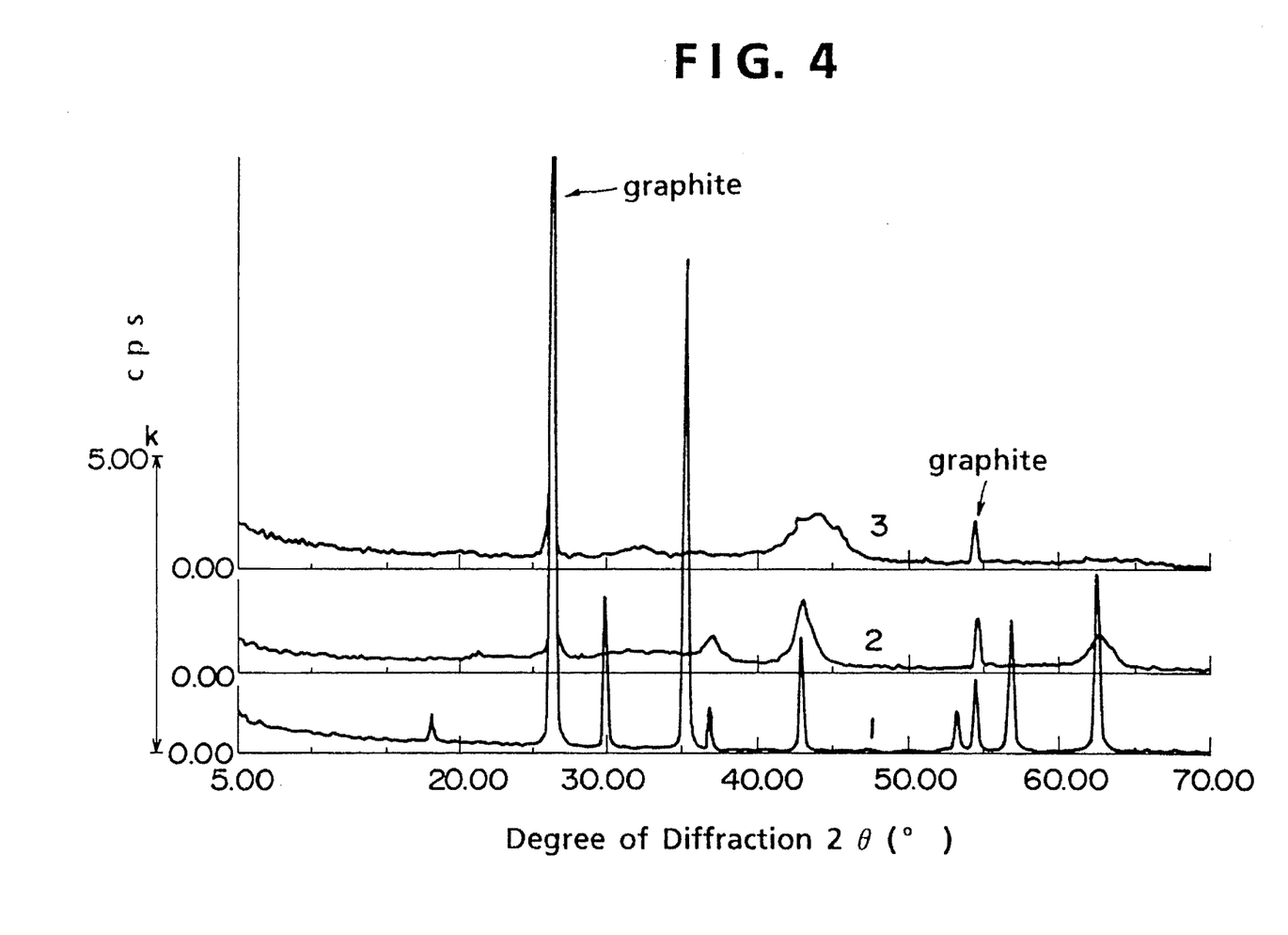
FIG. 4 shows X-ray diffractograms of the anode active material (spinel type-$Fe_3O_4$; after one charge-discharge cycle and after 10 charge-discharge cycles) used for Sample 31 of Comparison Example 1.

(3) X-ray diffractograms of the precursor for the anode active material of $Fe_3O_4$ of spinel type (Sample 31), the anode active material (at 1.8 V) that the precursor underwent 1 cycle of charging-discharging and the anode active material (at 1.8 V) that the precursor underwent 10 cycle of charging-discharging, were measured. The obtained X-ray diffractograms are shown in FIG. 4. The X-ray diffractogram of precursor of the anode active material is designated by "1" of FIG. 4, that of the anode active material after 1 cycle is designated by "2" and that of the anode active material after 10 cycles is designated by "3".

Subsequently, obtained batteries were evaluated as to safety.

(1) The battery of Sample 4 of Example 1 was evaluated by the following safety test.

Fifty of the batteries were subjected to 20 cycles of charging and discharging (5 mA/cm$^2$). Subsequently, the anode pellets were taken out from the batteries in air of 60 %RH, and the pellets were observed as to whether spontaneous ignition took place or not.

(2) The following batteries (Comparison Example 2) were evaluated in the same manner as above (1).

COMPARISON EXAMPLE 2

The procedures of Example 1 were repeated except for using Li-Al alloy (Li/Al=80/20, by weight, diameter:15 mm, thickness: 0.6 mm) as the anode active material to prepare secondary batteries of coin-type.

All the batteries of Sample 4 did not ignite, but thirty-two of batteries obtained in Comparison Example 2 ignited. Hence, it is apparent that the battery of the invention has high safety.

As is apparent from results of Examples 1 to 5 and Comparison Example 1, the battery using the anode active material of the invention shows high discharging voltage, high discharge capacity and a long life in charge-discharge cycle.

The X-ray diffractograms (FIG. 2) of the precursor for the anode active material and the anode active material of Sample 4 of Example 1 shows that the X-ray diffractogram is changed (in location or height of peak) by insertion of lithium ions (charging) but is not changed during repetition of charging and discharging. In contrast, the X-ray diffractograms (FIG. 3) of the anode active material of Sample 30 of Comparison Example 1 show that the X-ray diffractograms are not changed (in location or height of peak) after one cycle of repetition of charging and discharging but are changed after 10 cycles of the repetition. Further, the X-ray diffractograms (FIG. 4) of the anode active material of Sample 3 of Comparison Example 1 show that the X-ray diffractograms are changed after one cycle of repetition of charging and discharging and are also changed after 10 cycles of the repetition. Hence, these results show that the batteries of Comparison Example 1 never have long life in charge-discharge cycle.

Further, the procedures of Sample 4 of Example 1 were repeated except for using composite prepared by coating the mixture for anode the thin plate by means of blade, knife or extrusion coating method and punching the coated plate as a precursor for anode active material to prepare a secondary battery of coin-type. The resultant battery showed excellent characteristics in the same manner as those of Sample 4 of Example 1. Hence, these samples have revealed that the battery of the invention has excellent characteristics independent of methods of preparation of the anode active material.

Furthermore, the density of the pellet of the anode active material of the invention is in the range of 2.5 to 2.8 (g/cm$^3$) and therefore is about two times as large as that of burned carbonaceous material (1.1 to 1.4 (g/cm$^3$). Further, discharge capacity per volume of the anode active material of the invention is 2 to 3 times as large as that of burned carbonaceous material. Hence, discharge capacity of the anode active material of the invention is four or more times as large as that of burned carbonaceous material.

I claim:

1. A nonaqueous secondary battery which comprises an anode active material, a cathode active material and a nonaqueous electrolyte;

wherein said anode active material is a transition metal oxide comprising lithium ions, and wherein an inherent crystal structure of the anode active material has been changed by insertion of the lithium ions, and is in the condition that said changed crystal structure is essentially not changed during repeated charging and discharging.

2. The nonaqueous secondary battery as defined in claim 1, wherein said changed crystal structure of the anode active material is characterized by an X-ray diffractogram wherein each peak strength observed in the X-ray diffractogram at the diffraction angle of 5 to 70 degrees using Cu-Kα ray is in the range of 20 to 1,000 cps.

3. The nonaqueous secondary battery as defined in claim 1, wherein said change of inherent structure by insertion of lithium ions is confirmed by change of the X-ray diffractogram wherein the strength of a maximum peak of the transition metal oxide prior to insertion of lithium ions decreases to one fifth thereof or less, said maximum peak being observed in the X-ray diffractogram at the diffraction angle of 5 to 70 degrees using Cu-Kα ray.

4. The nonaqueous secondary battery as defined in claim 1, wherein said anode active material is obtained by electrochemical insertion of lithium ions.

5. The nonaqueous secondary battery as defined in claim 1, wherein lithium ions are inserted into said anode active material, wherein said anode active material is a transition metal oxide comprising lithium.

6. The nonaqueous secondary battery as defined in claim 1, wherein said transition metal oxide prior to insertion of lithium ions comprises a transition metal oxide represented by $Li_pMO_j$ wherein M is at least one transition metal selected from the group consisting of Ti, V, Mn, Co, Fe, Ni, Cr, Nb and Mo, p is in the range of 0 to 3.1, and j is in the range of 1.6 to 4.1.

7. The nonaqueous secondary battery as defined in claim 1, wherein said anode active material comprises a lithium-containing transition metal oxide represented by $Li_xMO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.

8. The lithium secondary battery as defined in claim 1, wherein said anode active material comprises a lithium-containing transition metal oxide represented by $Li_xM_qV_{1-q}O_j$ wherein M is at least one transition metal, x is in the range of 0.17 to 11.25, q is in the range of 0 to 0.7, and j is in the range of 1.3 to 4.1.

9. The nonaqueous secondary battery as defined in claim 1, wherein said cathode active material comprises a lithium-containing transition metal oxide represented by $Li_yMO_z$ wherein M is at least one transition metal selected from the group consisting of Co, Mn, Ni, V and Fe, y is in the range of 0.2 to 1.2, and z is in the range of 1.4 to 3.

10. The nonaqueous secondary battery as defined in claim 1, wherein said cathode active material comprises a lithium-containing transition metal oxide selected from the group consisting of $Li_yCoO_2$, $Li_yNiO_2$, $Li_yCo_aNi_{1-a}O_2$, $Li_yCo_bV_{1-b}O_z$, $Li_yCo_bFe_{1-b}O_2$, $Li_yMn_2O_4$, $Li_yMn_cCo_{2-c}O_4$, $Li_yMn_cNi_{2-c}O_4$, $Li_yMn_cV_{2-c}O_4$ and $Li_yMn_cFe_{2-c}O_4$ wherein y is in the range of 0.5 to 1.2, a is in the range of 0.1 to 0.9, b is in the range of 0.8 to 0.98, c is in the range of 1.6 to 1.96, and z is in the range of 2.01 to 2.3.

11. The nonaqueous secondary battery as defined in claim 1, wherein the transition metal oxide into which the lithium ions are inserted has been previously burned.

12. The nonaqueous secondary battery as defined in claim 1, wherein the transition metal oxide into which the lithium ions are inserted has been previously burned at a temperature of 250° to 2,000° C.

13. The nonaqueous secondary battery as defined in claim 1, wherein the transition metal oxide into which the lithium ions are inserted has been previously burned at a temperature of 350° to 1,500° C.

14. The nonaqueous secondary battery as defined in claim 1, wherein the transition metal oxide into which the lithium ions are inserted contains Li and at least one element selected from the group consisting of Ca, P, B, Si, Na, K, Mg, Sn, Al, Ga, Ge, Ce, In and Bi.

15. The nonaqueous secondary battery as defined in claim 1, wherein the transition metal oxide into which the lithium ions are inserted contains Li and at least one element selected from the group consisting of P, B and Si, and which has been incorporated into the transition metal oxide by burning $P_2O_5$, $Li_3PO_4$, $H_3BO_3$ or $SiO_2$ in combination with a transition metal oxide and a lithium compound.

16. The nonaqueous secondary battery as defined in claim 1, wherein the transition metal oxide into which the lithium ions are inserted contains Li and at least one element selected from the group consisting of Sn, Al, Ga, Ge, Ce, In and Bi, and which has been incorporated into the transition metal oxide by burning an oxide, a hydroxide, a carbonate or a nitrate of the element in combination with a transition metal oxide and a lithium compound.

17. The nonaqueous secondary battery as defined in claim 1, wherein the transition metal oxide into which the lithium ions are inserted has a mean grain size of 0.03 to 50 μm.

18. The nonaqueous secondary battery as defined in claim 1, wherein the cathode active material has a mean grain size of 0.03 to 50 μm.

* * * * *